Patented June 21, 1927.

1,633,132

UNITED STATES PATENT OFFICE.

ROBERT SCHOENHOEFER, OF BRUNSWICK, GERMANY.

PROCESS FOR PREPARING A MATERIAL FOR THE MANUFACTURE OF ARTIFICIAL STONE AND OTHER STONE OR ROCK PRODUCTS.

No Drawing. Application filed April 28, 1924, Serial No. 709,650, and in Germany September 30, 1920.

The present invention relates to a process for preparing a material, having self-setting and self-hardening properties, without the necessity of addition of any binding medium, for the manufacture of mortar, concrete, bricks, building blocks and the like directly from many substances and from many artificial stones. The substances consist in the main of lime (CaO) or lime together with magnesia (MgO), of silica ($SiO_2$) and of alumina ($Al_2O_3$) or alumina together with ferric oxide ($Fe_2O_3$). Such substances are:
1. many kinds of ashes, firegrate ashes or flue dust from combustible substances such as wood, peat, charcoal, coal, particularly brown coal, coke, refuse, combustible sludge, bituminous shale or oil shale and the like.
2. many varieties of slag resulting from metallurgical processes, more particularly from the metallurgy of iron, such as block slag (lump slag) flue dust from smelting furnaces (disintegrated slag), water-granulated or air-granulated slag sand, dust from the throats of furnaces, slags resulting from the manufacture of ingot iron or mild steel, and other slags, 3. many volcanic slags. 4. many stone or like products which are manufactured from the substances enumerated above under the headings 1 to 3, with or without binding materials, 5. most of the stone or like products which are manufactured from cement, such as cement wares, concrete and the like. These substances which in themselves have little or no binding properties are capable of being converted by means of the process according to the present invention into stone or like materials which are capable of setting and hardening, in that they are crushed and thoroughly kneaded with great force, either separately or mixed together, while in a moderately moistened condition. By introducing into the material the energy of kneading while the material is in a moderately moist condition, its binding properties and capability of hardening are "stimulated" or "re-animated".

The preparation of the material is preferably effected in edge-runner mills which crush and thoroughly knead the material with great force, heavy and quick running edge-runner mills being particularly suitable, but other suitable machines may be employed.

During the crushing and kneading treatment in the edge-runner mill the substances will of course also be disintegrated. This disintegration however, only plays a secondary part, and is limited in consequence of the comparatively short duration of the process. The disintegration is an incidental but very desirable concomitant occurrence. The degree of fineness of the primary material is not of great importance for the process. The most important requirement is the kneading, for which a coarse grained condition with not too fine a grain suffices. The primary material in the form of pieces thus only requires to be roughly broken up and when the process is carried out in large edge-runner mills, may contain pieces up to the size of a man's fist.

During the crushing and kneading operation chemical changes are initiated which bestow particular characteristics on the process. First of all, the material becomes more moist by sweating and thereby darker. Further in the case of many varieties of ashes and slags the material exhibits an increasing rise in temperature which in spite of the considerable absorption of heat by the machine (edge-runner mill), in the case of many varieties of brown coal ash and blast furnace slag rises to such a degree that clouds of steam rise up from the material. It may often be observed that the great rise in temperature only becomes fully apparent in the prepared material or the products manufactured therefrom. With many varieties of ash and slag a further phenomenon becomes apparent, in consequence of the initiated chemical changes, in the escape of gases such as sulphuretted hydrogen or ammonia, the presence of which is positively shown by their smell. The stimulated binding capability of the material is readily perceivable, in that the originally incoherent mass becomes coherent, which is shown by the material caking into lumps and more particularly by the formation in the edge-runner mill of clods which become increasingly firmer. The material is also capable of being readily agglomerated by hand to form lumps and is capable of being readily compressed. The considerable chemical and physical alteration of the material in many cases becomes apparent by the material after its preparation is complete, or the products mnufactured from it, having a different colour than that of the primary material or materials.

The duration of the treatment of the material is of course variable and depends on the one hand on the nature of the primary material and on the other hand on the force and speed with which the treatment is effected. The surest indication that the treatment of the material has been completed is the vigorous formation of lumps and clods. In the case of very suitable primary materials and where heavy, quick running edge-runner mills are employed, two to four minutes suffices for the treatment. In the case of primary materials which are less suitable for the purpose the required time will be longer. In the case of a mixture of primary materials, the time required should be reckoned as the mean of that required for the various constituents of the mixture. If the treatment is not effected in batches but continuously, the time required for the treatment of the respective primary material will determine the average time which the material remains in the edge-runner mill (machine). A lengthy treatment of the material extending beyond the time necessary for preparing it will increase its quality up to a certain limit.

The prepared material, which has all the qualities of a binding medium which has been made up with water, settles, when allowed to stand, more or less rapidly according to the nature and quality of the primary materials, and solidifies to form a firm stone-like substance which possesses an increasing strength. If the material is compressed under high pressure into blocks then the solidification and consolidation is much more rapid and intensive.

For the purpose of economizing the amount of the material to be employed or for the purpose of obtaining definite properties such as greater porosity, reduced weight, increased hardness, reduced heat conductivity or the like, filling materials of various kinds may be added in varying quantities. The addition of such filling substances can be effected before, during, or after the treatment of the material. The following are examples of filling substances which may be employed; gravel, road metal, sand, slag sand, pumice sand, ashes, asbestos, kieselguhr, sawdust, wood meal, peat moss, and the like.

Any addition of the known binding mediums (lime, cement, trass, gypsum, and the like) does not generally serve any practical purpose because on the one hand a small addition will have scarcely any effect and on the other hand the addition of a large amount would of itself supply the necessary binding power.

The quality of the material may in many cases be increased by the addition thereto of chemicals, among which may be included alkaline hydroxides, alkaline salts, particularly carbonates and ammonium carbonate, magnesium salts particularly magnesium chloride (the final mother liquor in the manufacture of potash), calcium salts more particularly calcium sulphide, calcium chloride, calcium carbonate (limestone, chalk and lime marl), aluminium salts particularly aluminium sulphates (alums), iron oxides, iron hydroxides, iron salts particularly ferrous sulphate, soluble silicates particularly water-glass and the like. The addition of such substances in solid or soluble form during the treatment of the material in most cases has the effect of increasing the chemical changes, which in the case of many primary materials results in a vigorous generation of gases and the emission of a large quantity of heat.

In many cases the supply of heat to the material during the treatment thereof has also the effect of improving its quality. This can be effected by heating the machine (edge-runner mill), by pre-heating the primary material, or by employing hot water for mixing with it.

Moulded articles can readily be made from the material thus prepared, either with or without the addition of other substances, by strickling, beating or stamping it down in moulds or by pressing it in moulds under pressure. These moulded articles can be hardened in the air, the hardening period in the case of high grade primary materials only amounting to a few days.

In the case of many varieties of brown coal ash the moulded articles are already solid when they leave the press, and after a lapse of a few hours will have already attained a considerable degree of strength. Compressed moulded articles made from suitable blast furnace slags in the course of a few weeks attain a strength which approximates to that of well-burned bricks.

In the presence of steam under pressure the moulded articles after from five to ten hours attain a very high degree of strength and hardness which in the case of articles made from suitable blast furnace slags approximates to that of clinker bricks. The effect is similar when the hardening is effected in carbon di-oxide at different pressures and temperatures. In many cases the moulded articles may also be hardened in hot air or in hot water.

If the freshly prepared material is stirred up with water it changes into a white mass having the consistency of dough or into a more or less fluid paste or mud, according to the consistency of the material and the amount of water added thereto. In this condition the material may be employed as mortar or concrete, either alone or mixed with filling substances.

The material after being mixed with water not only retains its binding properties after being allowed to stand for a while, but as a rule it will be improved by this treatment. Further chemical changes will be initiated by this standing aside in the wet condition or "soaking process" and the material will be opened up still more (more particularly in the case of the silicic acid). These additional chemical, physical and colloidal modifications of the material which take effect within a few days, are recognizable by the material usually becoming very discoloured while as a rule a further emission of gases takes place, particularly sulphuretted hydrogen or ammonia, the material swelling up and increasing in plasticity.

The addition of water may be so great that a thin fluid, slimy or milky substance results. After a short time the material settles and the water superposed on it, which in many cases is yellow-green in colour, may be decanted off. The fluid mass which remains behind may be dried by natural or artificial means whereby a pasty or dough-like material will be obtained.

The soaked material is richer and more active than the material in the freshly prepared state so that by employing it the amount of primary material and the work expended in preparing the material (in the edge-runner mills) is reduced. The material thus soaked may be used in a similar manner to the freshly prepared material and what has been said with regard to the freshly prepared material also holds good in the case of the material after soaking. In adidtion, it may be mentioned that in many cases the great plasticity and tenacity of the soaked material renders it possible to produce bricks from it by means of extrusion presses as in the case of bricks made from clay.

The soaked material will keep for a long time without deteriorating. In many cases it has a tendency to solidify but this can be prevented by adding a greater quantity of water or by periodically stirring up. If the material has already solidified it can again be made soft and plastic by a speedy mechanical treatment (kneading).

Stone-like products manufactured from the freshly prepared or the soaked material have very often a property of distintegrating and forming a mud when kept in water, in consequence of the softening and expanding action of the water. This mud is equivalent to the soaked material and can be treated and employed in the same manner as it.

The nature and properties of the freshly prepared material and of the soaked material vary according to the primary materials employed and the proportions in which these materials are mixed. The same holds good in the case of the products prepared from the material. Valuable data are obtainable by means of chemical analysis. It is possible to obtain an idea as to the quality of the products more particularly by ascertaining the ratio of the three main constituents, lime, silicic acid and alumina. The additional substances such as sulphur, magnesium iron, etc., have however also a certain effect on the result. Thus in many cases a fairly large sulphur content will on the one hand result in a greater chemical activity, and on the other hand reduce the tendency to disintegrate. The presence of a considerable quantity of iron greatly increases the strength and reduces or prevents disintegration from taking place. It is very difficult to give detailed particulars as to the value of the various primary materials. As a general rule it may be stated that clean ashes and slags obtained from most brown coals and refuse as well as blast furnace slags resulting from the manufacture of pig-iron and the smelting of haematite and the stone products made therefrom, will give exceptional high grade products. Likewise, very good products will be obtainable from cement wares and concrete having a high cement content. It is advisable in practice to mix the low grade and medium grade primary materials with the high grade primary substances. It must be left to those skilled in the art to determine selection of the substances and their admixture by experiment.

The mode in which the invention is carried out in practice is capable of being considerably varied. From among the many applications of which the invention is capable, a few examples of the manufacture of building blocks will now be briefly described.

Suitable brown coal ashes or refuse ashes are moistened with a moderate quantity of water and prepared in the edge-runner mill. During the preparation of the material waste pieces of limestone, lime marl, dolomite and chalk may be added. The mass may either be compressed into blocks immediately or it is soaked. In the latter form, it can be worked up so as to produce light stones by being mixed with light filling substances, such as pumice sand, flocculent slag sand, kieselguhr, sawdust, peat moss and the like, and then compressed into blocks under light pressure. Owing to the great plasticity and tenacity of the soaked material, the manufacture of blocks may be effected in the extrusion press. Sand or slag sand may be added before, during, or after the preparation of the material, or to the soaked material, and the moulded products prepared therefrom may be hardened by steam under pressure.

Moderately dry slag sand or a mixture of dry and moist slag sand is prepared in the edge-runner mill and the material thus obtained is compressed into milled articles either immediately or after being mixed with wet or air-dried slag sand. The moulded articles thus produced can then be hardened by any suitable process. The addition of dry slag sand to the moist sand is for the purpose of obtaining the moderate degree of moisture content which is desired for the preparation of the material. This purpose may also be attained if air-granulated slag sand ashes or limestone and other dry suitable substances are added.

Broken up block slag, air-granulated slag sand, flue dust from smelting furnaces and the like are prepared in the edge-runner mill either alone or mixed together with the addition of water. Instead of water being added, a suitable quantity of wet slag sand may be very advantageously mixed with the material. Ashes or limestone, lime marl or the like may be mixed with the material. The material thus prepared is either compressed directly into blocks or for the purpose of economizing the quantity of material used and reducing the density of the block the material may be mixed with moist or air-dried slag sand. Material which has been stirred up with water or soaked is employed for the manufacture of slight stones into which nails are capable of being driven, by mixing flocculent slag sand with the material which is then cast, moulded or lightly pressed. The light stones or blocks manufactured in this manner may also be hardened in the well-known manner.

The mechanical re-animation of the binding property can be put to various practical uses and in many cases the binding property may be re-animated time after time.

The waste pieces which result from the manufacture of concrete, mortar, ash stones, slag stones, cement wares, cement and concrete artificial stones and the like, owing to mistakes, fracture or testing of the material, freezing or wetting of the cement and so on may be worked up so as to be converted again into mortar, concrete or other stone-like products. Likewise masonry composed of ash stones, slag stones or cement which has been demolished or which has broken down, may in many cases again be converted into building materials which are suitable for the construction of masonry. With regard to the re-utilization of the products manufactured from cement and filling substances (sand, or sand together with gravel) during the preparation of the material the mixture becomes leaner. Since in most cases the binding property is also reduced it is thus advisable to add fresh cement to the material while being prepared if the previous strength is again to be attained. In the case of concrete however, coarse filling substances (gravel) must be added if the previous texture is to be retained.

The blocks produced from many substances particularly those produced from ashes when laid in water or exposed to damp have a tendency to expand and to crack in consequence of this expansion, whereby the block frequently collapses into a number of pieces or becomes reduced to mud. The occurrence of this expansion may in many cases be avoided or reduced by means of the following procedure.

The stone-like products which have a tendency to expand are repeatedly saturated with water and allowed to dry again until finally after being kept continually in water they show no tendency or at least no appreciable tendency to expand.

In many cases the addition of porous filling materials is found to be very satisfactory. The expanding particles are thereby kept further apart and have more room in which to expand so that the tendency of the particles to expand will not result in cracks. Suitable porous filling substances of this kind are flocculent slag sand or volcanic dust (pumice sand). The addition of substances which contain silicic acid in a soluble form or in the form which is readily set free also prevents in many cases the expansion. Such substances are slag sand, kieselguhr, trass and the like.

The soaking may also in many cases prevent the occurrence of the expansion phenomenon. Soaking the material in water and subsequently allowing it to stand exposed to the air has a particularly favourable action in that the sulphur compounds which cause the expansion are dissolved out or destroyed, the greater portion of the sulphur escaping in the form of sulphuretted hydrogen.

In the case of many substances particularly in the case of many varieties of ashes, subsequent expansion may be prevented by subjecting the primary material first of all to a preliminary treatment by mixing it with water to form a mortar-like grout which solidifies into a friable stone-like mass. This mass is then treated in the usual manner while in a moderately moist condition.

In many cases the expansion is prevented by steaming the primary substances before the preparation of the material. The stone-like material prepared from the primary substances in the manner previously described may also be treated with steam. By the action of the hot steam the harmful sulphur compounds will also be destroyed.

What I claim is:—

1. A process for preparing a self-setting and self-hardening material for the manufacture of artificial stone in the absence of cement or other binding mediums, comprising the admixture of the residual ash of a solid combustible substance and slag with a relatively small amount of water, kneading, rolling and stamping the mixture while in a moist condition until lumps are formed, and exposing the mixture to steam at a pressure substantially greater than atmospheric pressure for the purpose of hardening said mixture.

2. A process as claimed in claim 1, said mixture being permitted to stand for a relatively long time in its moist condition before being subjected to said hardening treatment.

In testimony whereof I have signed my name to this specification.

ROBERT SCHOENHOEFER.